(12) United States Patent
Sumiya et al.

(10) Patent No.: US 7,600,710 B2
(45) Date of Patent: Oct. 13, 2009

(54) REEL

(75) Inventors: Yosuke Sumiya, Kanagawa (JP); Shozo Onmori, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 12/223,000

(22) Filed: Aug. 21, 2008

(65) Prior Publication Data

US 2009/0057463 A1 Mar. 5, 2009

(30) Foreign Application Priority Data

Sep. 5, 2007 (JP) .............................. 2007-230626

(51) Int. Cl.
  *B65H 75/18* (2006.01)
(52) U.S. Cl. .............. 242/611.1; 242/610.4; 242/332.4; 242/348
(58) Field of Classification Search ................. 242/348, 242/348.2, 332.4, 532.6, 609, 609.1, 610, 242/610.4, 611, 611.1, 608, 608.8; 360/132
  See application file for complete search history.

(56) References Cited

U.S. PATENT DOCUMENTS 6,491,247 B2 * 12/2002 Huettenegger .............. 242/342
6,676,055 B1 * 1/2004 Martin ........................ 242/340
7,252,258 B2 * 8/2007 Iino ............................ 242/348
7,287,716 B2 * 10/2007 Asano ......................... 242/348
7,334,751 B2 * 2/2008 Suzuki ........................ 242/340
7,350,732 B2 * 4/2008 Sasaki et al. ................ 242/348
7,497,397 B2 * 3/2009 Sasaki et al. ............. 242/338.1
2005/0205714 A1 * 9/2005 Horita ......................... 242/611
2006/0231660 A1 * 10/2006 Yamamoto et al. ....... 242/338.1
2009/0057463 A1 * 3/2009 Sumiya et al. .............. 242/348

FOREIGN PATENT DOCUMENTS

JP 2000-048526 2/2000

* cited by examiner

*Primary Examiner*—William A Rivera
(74) *Attorney, Agent, or Firm*—Jean C. Edwards, Esq.; Akerman Senterfitt LLP (57) ABSTRACT

The invention of the present application provides a reel, which comprises a cylindrical resin hub with a base and an outer peripheral surface around which a recording tape is wound, a reel gear formed at an outer surface of a base portion of the hub which engages with a drive gear of a drive device, a metal reel plate provided at the outer surface of the base portion of the hub on a radially inner side of the reel gear by insert molding, a gate trace formed on the base portion of the hub, and a plurality of groove portions formed at regular intervals in a circumferential direction between the reel gear and the reel plate. The groove portions are formed at least at a predetermined area on a virtual straight line connecting a center portion of the hub and a gate trace.

7 Claims, 11 Drawing Sheets

REEL

CROSS-REFERENCE TO RELATED APPLICATION

This application claims priority under 35 USC 119 from Japanese Patent Application No. 2007-230626 filed Sep. 5, 2007, the disclosures of which is incorporated by references herein.

BACKGROUND

1. Technical Field

The present invention relates to a reel on which a recording tape such as a magnetic tape, generally used as data recording/playback media of a computer, is wound.

2. Related Art

A recording tape cartridge in which a recording tape such as a magnetic tape, which is used as data recording/playback media (data backup) of a computer or the like, is wound on a synthetic resin reel and a single reel is accommodated in a case has been conventionally known. The reel used in this recording tape cartridge includes a hub, and one of upper or lower flanges is integrally formed with the hub and the other of the upper or lower flanges is welded to the hub.

In addition, a reel gear with which a drive gear provided on a drive device side is engageable is annularly formed on an outer surface of a base portion of the reel, and a reel plate to which a magnet provided on the drive device side may be stuck is integrally and coaxially attached by an insert molding on a radially inner side of the reel gear. Also, it is desirable that an outer peripheral surface of a hub of the reel is made a perfect circle in plan view in view of stabilizing a running speed of the recording tape.

Figure 9:
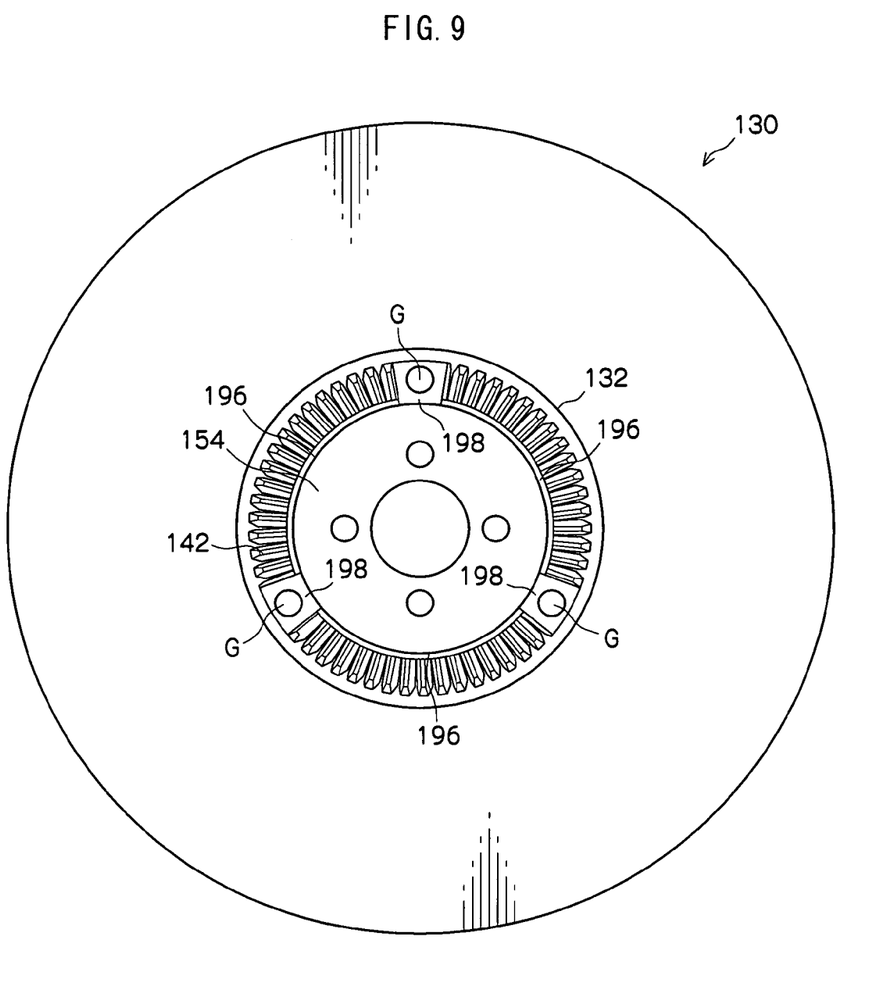
FIG. 9 is a schematic bottom view showing a base portion of a reel hub of a conventional reel.
Figure 10:
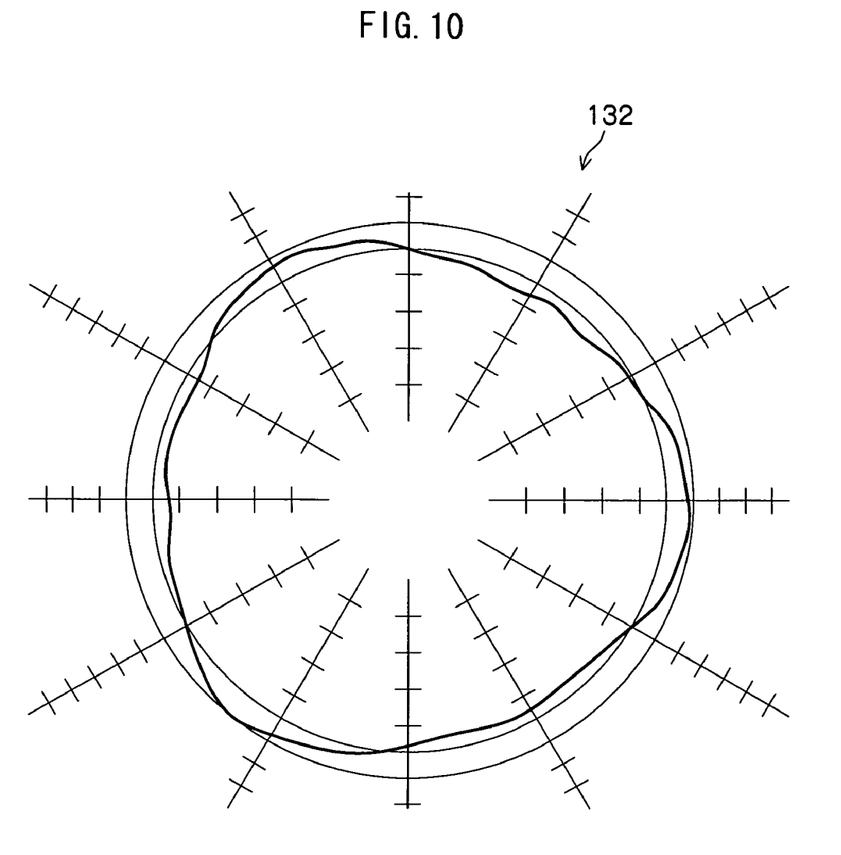
FIG. 10 is an illustration diagram showing a result of measuring circularity of an outer peripheral surface of the reel hub of the conventional reel.

However, there are cases in which the outer peripheral surface of a hub 132 is actually formed into a substantial equilateral triangle in plan view, as shown in FIG. 10. In this case, as shown in FIG. 9, three gate regions (gate traces G) without teeth are formed at regular intervals on a reel gear 142 in a reel 130. In a mold, a reel plate 154 is usually held except for at the gate regions (it is not held at the gates), so that three groove portions 196 are formed between the reel plate 154 and portions excluding the gate regions, and the groove portions 196 are not formed between the gate regions and the reel plate 154 (instead, three engagement portions 198 are formed thereat).

Therefore, when a resin material contracts (cools) upon removal from a mold, since the groove portions 196 are not formed at the non-toothed areas of the reel gear 142, that is to say, not formed at the areas at which gate traces G are formed (the engagement portions 198 are formed instead), contraction of the reel plate 154 is suppressed. In addition, since resin pressure is high in the vicinity of the gates (gate traces G), the amount of contraction thereat is lower than that of other portions. Therefore, as shown in FIG. 10, the outer peripheral surface of the hub 132 is formed into a substantial equilateral triangle, having the areas without teeth as apexes thereof in plan view. When the outer peripheral surface of the hub 132 is formed into a substantial equilateral triangle in plan view such as this, the running speed of the recording tape is uneven, causing concerns about reading errors at the drive device side.

SUMMARY

The present invention provides the reel capable of improving circularity of the outer peripheral surface of the hub in view of the above description.

A aspect of the invention is a reel including: a cylindrical resin hub with a base and an outer peripheral surface around which a recording tape is wound; a reel gear formed at an outer surface of a base portion of the hub which engages with a drive gear of a drive device; a metal reel plate provided at the outer surface of the base portion of the hub on a radially inner side of the reel gear by insert molding; a gate trace formed on the base portion of the hub; and a plurality of groove portions formed at regular intervals in a circumferential direction between the reel gear and the reel plate, wherein the groove portions are formed at least at a predetermined area on a virtual straight line connecting a center portion of the hub and a gate trace.

BRIEF DESCRIPTION OF THE DRAWINGS

Exemplary Embodiments of the present invention will be described in detail based on the following figures, wherein.

DETAILED DESCRIPTION

Figure 1A:
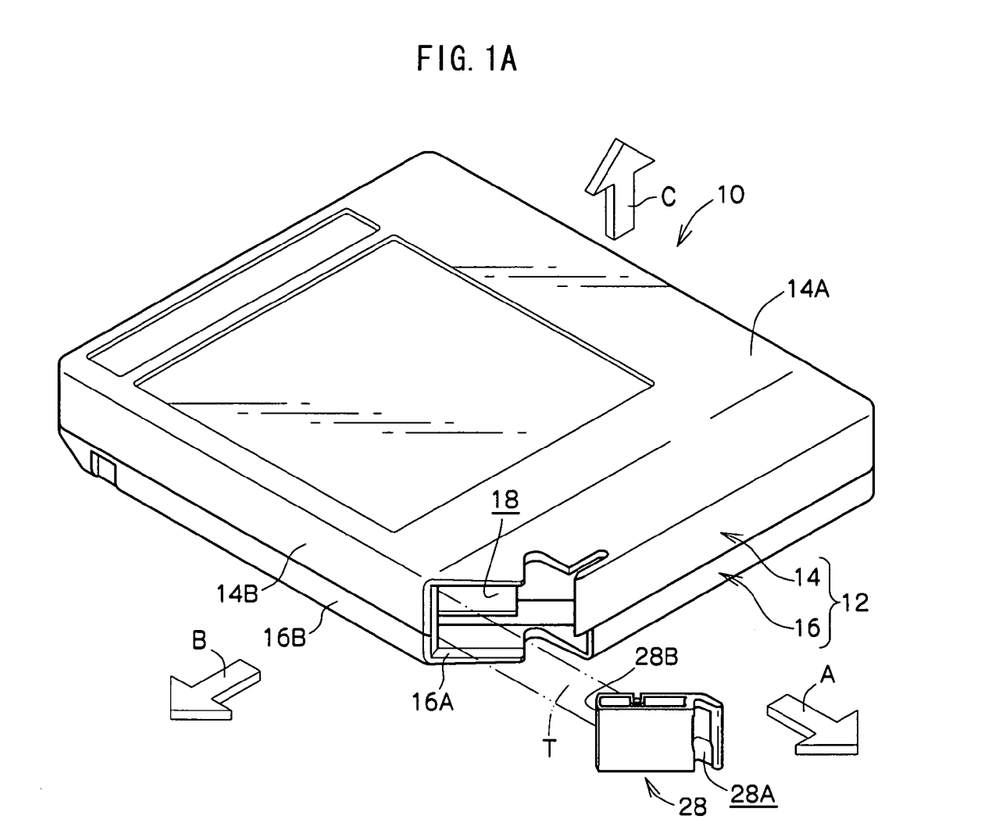
FIG. 1A is a schematic perspective view of a recording tape cartridge from above.
Figure 1B:
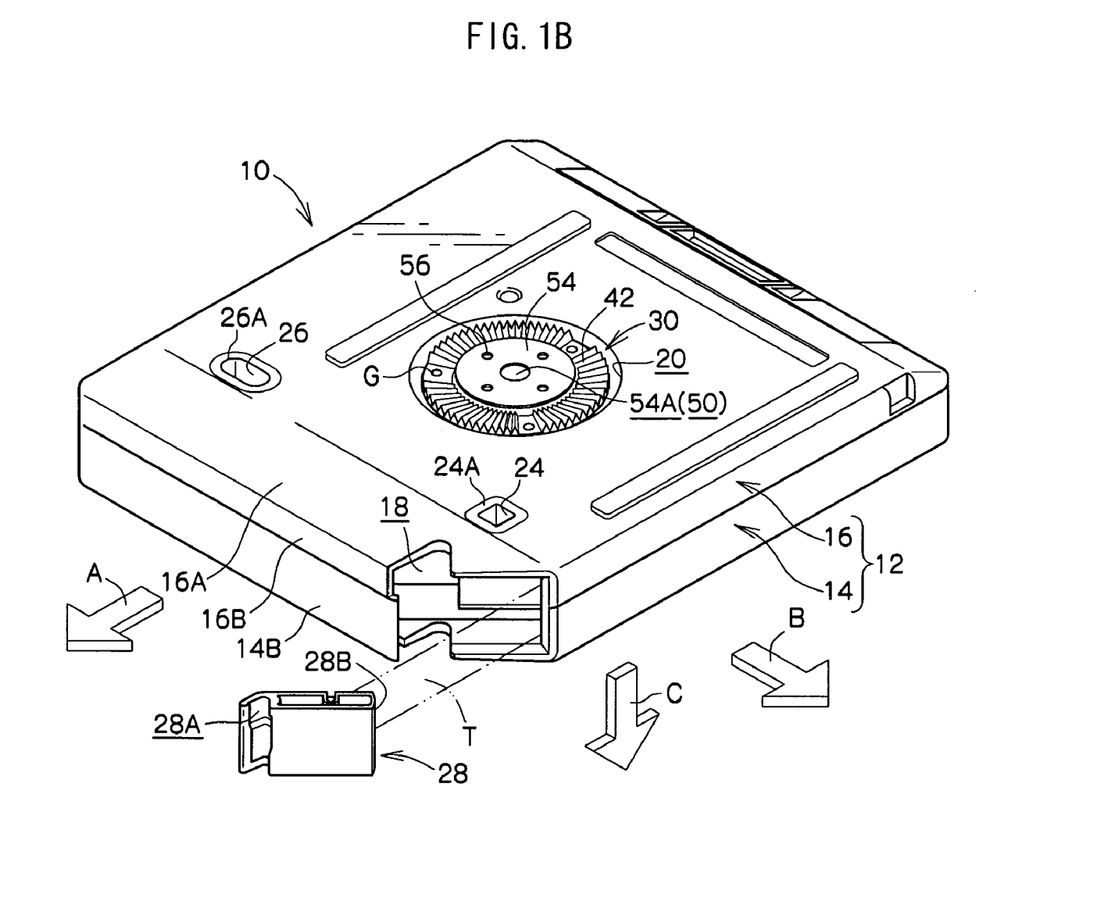
FIG. 1B is a schematic perspective view of the recording tape cartridge from below.

Hereinafter, the preferred exemplary embodiment of the present invention will be described in detail based on examples shown in the figures. First, a schematic configuration of a recording tape cartridge 10 provided with a reel 30 according to the exemplary embodiment will be described. Meanwhile, for convenience of description, a direction of loading the recording tape cartridge 10 into a drive device is indicated by an arrow A, as shown in FIGS. 1A and 1B, so that the arrow A is a forward direction (front side) of the recording tape cartridge 10. Also, a direction orthogonal to the arrow A direction is indicated by an arrow B, so that the arrow B is a rightward direction (right side) of the recording tape cartridge 10. In addition, a direction orthogonal to the arrow A direction and the arrow B direction is indicated by an arrow C, so that the arrow C is an upward direction (upper side) of the recording tape cartridge 10 and the reel 30.

As shown in FIGS. 1A and 1B to FIG. 3, the recording tape cartridge 10 is provided with a resin case 12. The case 12 is formed by joining an upper case 14 and a lower case 16 together. Specifically, the upper case 14 is formed such that a substantially frame-like peripheral wall 14B is disposed along an outer edge of a top plate 14A, which is substantially rectangular in plan view, in a standing manner. The lower case 16 is formed such that a substantially frame-like peripheral wall 16B is disposed along an outer edge of a bottom plate 16A, which substantially corresponds to the top plate 14A, in a standing manner. In addition, the case 12 is formed into a substantially rectangular box shape by joining the upper case 14 and the lower case 16 together by ultrasonic welding or screwing, in a state in which an open end of the peripheral wall 14B and an open end of the peripheral wall 16B abuts each other.

On a corner portion of the case 12 on a head side thereof in the loading direction into the drive device, an opening 18, which slants toward the loading direction, is formed by cutting off the top plate 14A, the peripheral wall 14B, the bottom plate 16A and the peripheral wall 16B. A circular gear opening 20, which passes through the bottom plate 16A, is formed, on a substantially central portion of the bottom plate 16A, so that a reel gear 42 is exposed as described later. An annular rib 22 is formed on an edge portion of the gear opening 20 on the bottom plate 16A in a protruding manner toward inner side of the case 12, so that the reel 30 can be fitly positioned and be prevented from dust as described later.

Further, a pair of positioning holes 24 and 26 are formed in the vicinity of a forward end on an outer surface of the bottom plate 16A of the case 12. The pair of positioning holes 24 and 26 are formed into sac-shape in projections (not shown), which are provided on the bottom plate 16A toward inner side of a standing manner into the case 12, and are disposed on a virtual line in the arrow B direction so as to be spaced apart from each other.

In addition, the positioning hole 24 on a side closer to the opening 18 is formed into substantially square when viewed from the base surface, circumscribing a positioning pin (not shown) of the drive device. The positioning hole 26 is formed into an elongate hole, which is longitudinal along the virtual line and having a width corresponding to a diameter of the positioning pin. Therefore, when the recording tape cartridge 10 is loaded into the drive device and the positioning pins are inserted into each of the positioning holes 24 and 26, this is correctly positioned in a horizontal direction (right and left and up and down) in the drive device.

Further, circumferences of the positioning holes 24 and 26 on the bottom plate 16A are provided with reference surfaces 24A and 26A, which are finished so as to be smoother than other portions (design surface). The reference surfaces 24A and 26A are adapted to reference surfaces (not shown) of the drive device, which are provided around the positioning pins, respectively, when the positioning pins are inserted into the positioning holes 24 and 26. Thereby, the recording tape cartridge 10 is positioned in a vertical direction in the drive device.

Figure 2:
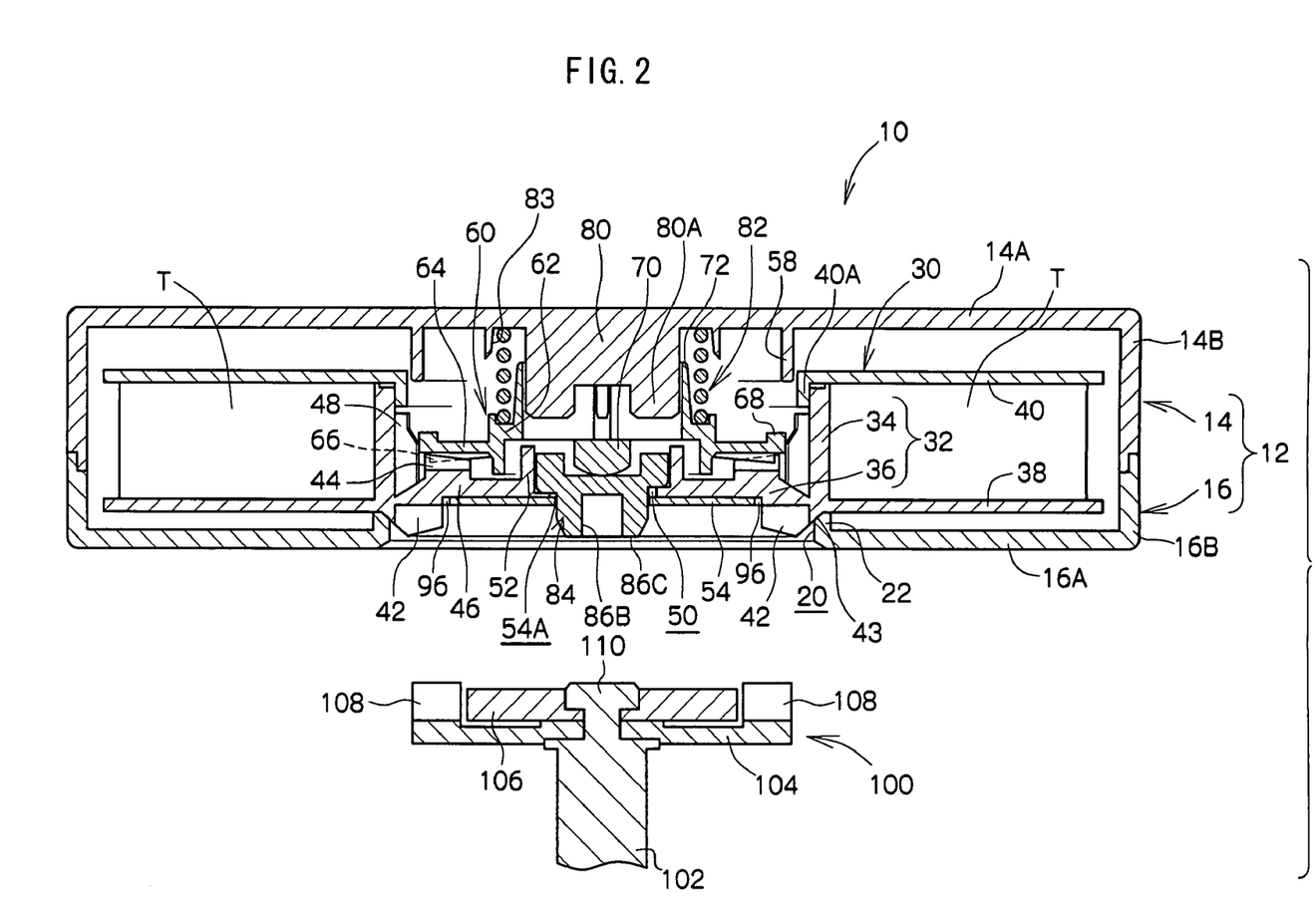
FIG. 2 is a schematic cross-sectional view when a reel of the recording tape cartridge is in a rotation locking position.
Figure 3:
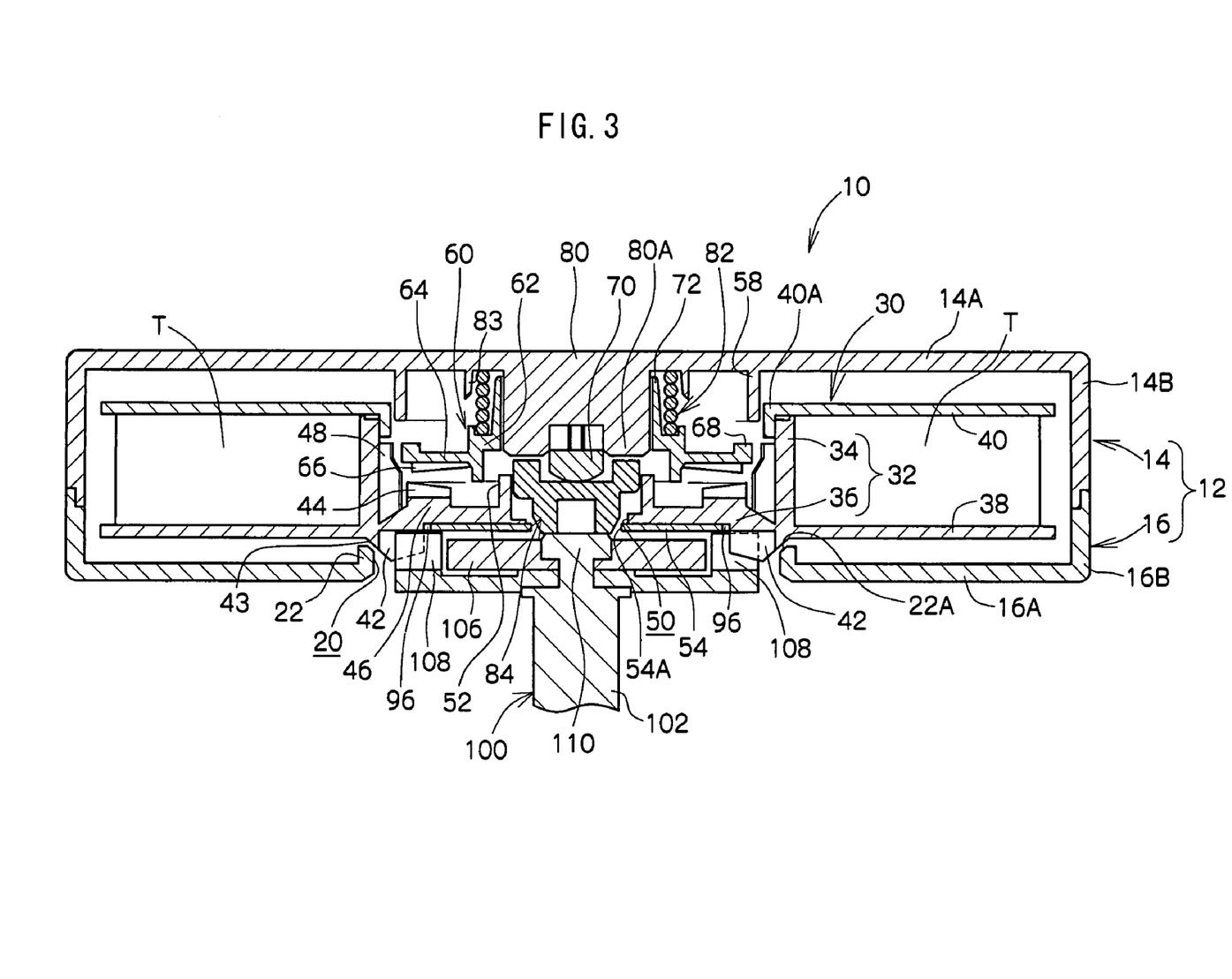
FIG. 3 is a schematic cross-sectional view when the reel of the recording tape cartridge is in a rotation allowing position.

Further, only one resin reel 30 (the detail thereof will be described later) is rotatably accommodated in the case 12, as shown in FIGS. 2 and 3. A recording tape T such as a magnetic tape is wound on this reel 30, and a reader block 28 as a reader member is attached to a tip end of the recording tape T, as shown in FIGS. 1A and 1B. The reader block 28 is accommodated and kept inside of the opening 18 of the case 12, when the recording tape cartridge 10 is not used. In this state, the reader block 28 blocks the opening 18 to prevent dust or the like from entering into the case 12.

An engaging concave portion 28A is formed on a tip end of the reader block 28. When pulling out the recording tape T in the drive device, it is pulled out from the case 12 by pulling-out means (not shown), so that it engages with the engaging concave portion 28A and is guided to a take-up reel (not shown) of the drive device. Further, an end face of the reader block 28 opposite the engaging concave portion 28A thereof is provided with a circular arc surface 28B. The circular arc surface 28B forms a portion of a take-up surface, which takes up the recording tape T by being inserted into a reel hub of the take-up reel.

Next, the reel 30 and brake for preventing rotation of the reel 30 when not in use, will be described. As shown in FIGS. 2 to 8, the reel 30 is provided with a reel hub 32, which forms an axial center thereof. The reel hub 32 is substantially cylindrical, including a base, and having a cylindrical portion 34, which opens upward, an outer peripheral surface on which the recording tape T is wound, and a base portion 36, which blocks a lower portion of the cylindrical portion 34 except for a through-hole 50 to be described below. A lower flange 38 extends outward radially on the same axis and in an integrated fashion from an outer peripheral edge portion of the base portion 36 of the reel hub 32.

Further, an upper flange 40 (omitted in FIGS. 4 and 5) is joined to an upper end portion of the reel hub 32, and the reel 30 according to the exemplary embodiment is made as a so-called 2-piece structure. That is to say, in the upper flange 40, an outer diameter thereof is same as an outer diameter of the lower flange 38 and a short tubular portion 40A of which outer diameter corresponds to an inner diameter of the cylindrical portion 34 is disposed on an axial center portion thereof, and this is concentrically fixed to the reel hub 32 by ultrasonic welding in a state in which the short tubular portion 40A inter-fits in the vicinity of an upper end of the cylindrical portion 34. Thereby, the reel 30 is configured such that the recording tape T may be wound on the outer peripheral surface of the cylindrical portion 34 of the reel hub 32, between opposite surfaces of the lower flange 38 and the upper flange 40.

The reel gear 42, which is annularly formed so as to be coaxial with the reel 30 as a whole, is formed near the outer peripheral edge portion at the lower surface of the base portion 36 of the reel hub 32. The reel gear 42 is engageable with a drive gear 108 disposed at a tip end of a rotation shaft 100 (to be described below) of the drive device. This reel gear 42 is configured such that a tooth tip thereof protrudes downward from the lower surface of the lower flange 38 and a tooth base thereof is located above the lower surface of the lower flange 38, and further, a radial outer end portion of each tooth is connected by a tapered portion 43, which is continuous to the lower flange 38 from a central portion in a height direction of the tooth to the tooth base.

Meanwhile, a plurality of (three, in a shown example) gate traces G, which were made as molding resin material inlets, are formed on predetermined positions on the reel gear 42 at predetermined intervals (regular intervals). In addition, an engaging gear 44, which is annularly formed so as to be coaxial with the reel 30 as a whole, is formed in the vicinity of the outer peripheral edge portion on an upper surface (inner surface) of the base portion 36 of the reel hub 32. The engaging gear 44 is formed on an annular base portion 46 which is slightly raised from the upper surface of the base portion 36, and is engageable with a braking gear 66 of a braking member 60 as described later.

Further, a plurality of standing ribs 48 standing along an axis direction of the reel 30 are formed at regular intervals on an inner peripheral surface of the reel hub 32, that is to say, from an upper surface (inner surface) of a base portion 36 on a radially outer side of the engaging gear 44 to an inner peripheral surface of the cylindrical portion 34. Due to the existence of the standing ribs 48, the engaging gear 44 is located on a radially inner side of the reel gear 42. The standing ribs 48 will be described in detail below together with the braking member 60.

On the other hand, a reel plate 54, which is an annular metal plate formed of a magnetic material, is coaxially and integrally provided by insert molding on the radially inner side of the reel gear 42 on a lower surface (outer surface) of the base portion 36 of the reel hub 32. Specifically, a plurality of (four, in the drawing) small holes 56 are formed on the reel plate 54 at a predetermined intervals (at regular intervals) in a circumferential direction and a step portion (not shown) having an opening diameter in a lower portion larger than in an upper portion thereof is formed at an inner peripheral surface of each of the small holes 56. Therefore, after the reel plate 54 is set in a mold, a resin material enters the small holes 56 and the resin material penetrates to a lower surface of the step portion and is solidified, and thereby the reel plate 54 is firmly fixed to the base portion 36.

Further, a through-hole 50, which passes through the base portion 36, is disposed on an axial center portion on the base portion 36 of the reel hub 32. Also, a short cylindrical boss portion 52 for clutch is provided on the upper surface of the base portion 36 in a standing manner along an edge portion of the through-hole 50. The boss portion 52 for clutch will be described together with a clutch member 84 to be described later. Also, the axial center portion of the reel plate 54 is provided with a transparent hole 54A, and an inner diameter of the transparent hole 54A is made slightly smaller than an inner diameter of the through-hole 50.

Figure 6:
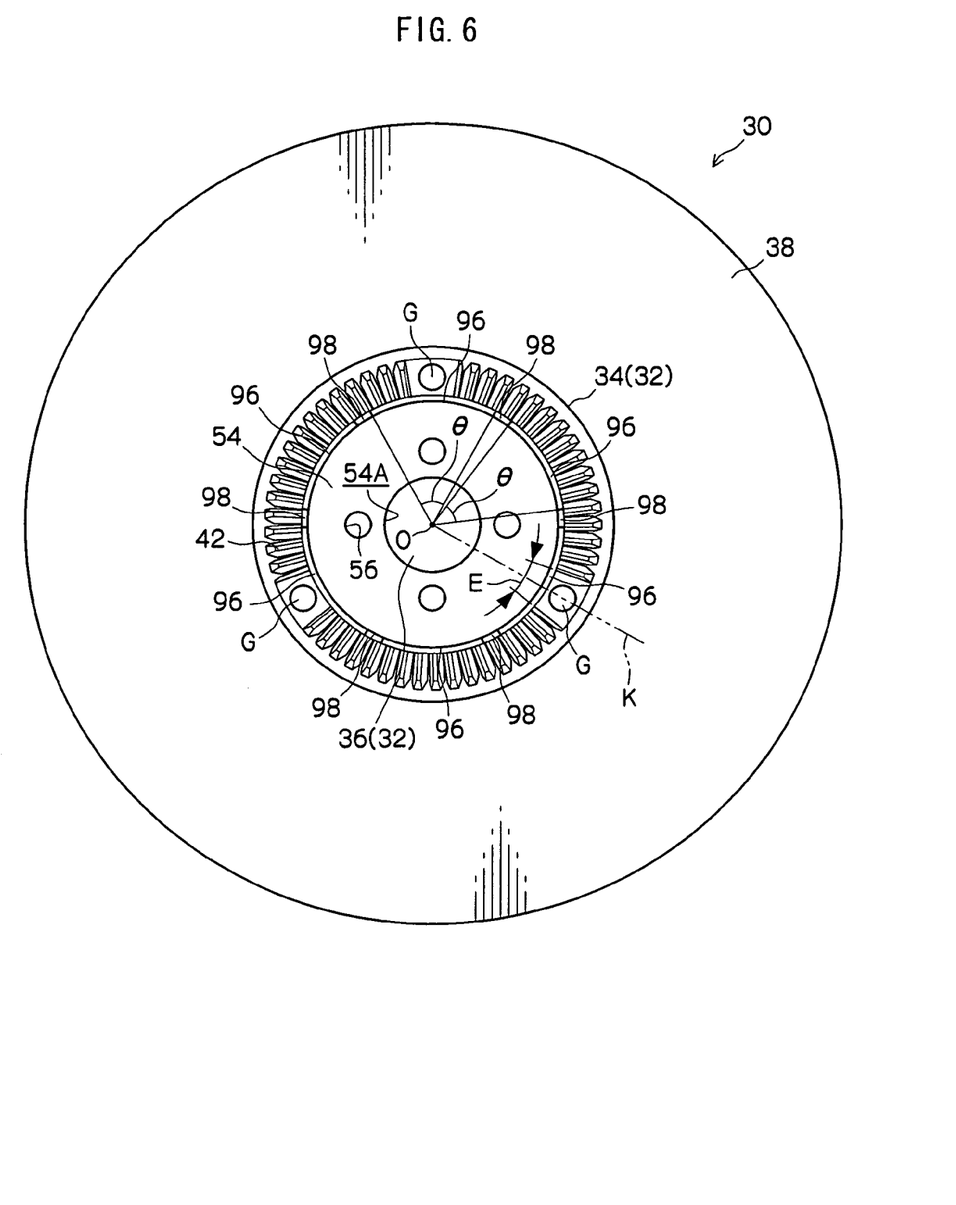
FIG. 6 is a schematic bottom view showing a base portion of a reel hub of a reel according to the exemplary embodiment.

Also, on the lower surface (outer surface) of the base portion 36 of the reel hub 32, a plurality of (six or more) groove portions 96 are formed at regular intervals in a circumferential direction between the reel gear 42 and the reel plate 54. Specifically, as shown in FIG. 6, for example, six groove portions 96 each corresponding to an angle θ of 40 degrees with respect to the center, are formed at regular intervals, including three predetermined areas (corresponding to a width of a non-toothed portion) E on a virtual line K that connects a rotational center O of the reel 30 (reel hub 32) and gate traces G, which are inlets for a resin material that integrally forms the reel hub 32 and a lower flange 38.

Meanwhile, the number of groove portions 96 is set six or more so as to make the outer peripheral surface of the reel hub 32 closer to a perfect circle. That is to say, it is preferable that six or more groove portions 96 are formed at regular intervals so as to make a substantial regular hexagon or a polygon with more sides in plan view. Also, the groove portions 96 become holding portions for holding the reel plate 54 in the mold (not shown). Therefore, the resin material flows into the areas apart from the holding portions and the portions are made engagement portions 198 for engaging with the reel gear 42 and the reel plate 54.

In addition, the reel 30 is accommodated in the case 12 and is placed on the annular rib 22 when not used. Specifically, the reel 30 is configured such that a radially outer side portion of the tapered portion 43 on the base portion 36 (neighborhood of an inner peripheral edge portion of the lower flange 38) abuts the upper end surface of an annular rib 22. Therefore, radial movement is regulated as an upper end inner peripheral edge portion of the annular rib 22 is formed with a tapered surface 22A corresponds to the tapered portion 43. In this manner, it is configured to prevent dust from entering thereinto.

In such a state, the reel 30 is located in the case 12 as a whole and exposes the reel gear 42 and the reel plate 54 from the gear opening 20 (refer to FIG. 1B). That is to say, the reel gear 42 faces outside of the case 12 from the gear opening 20 without protruding from an outer surface (lower surface) of the bottom plate 16A. Also, the through-hole 50 faces the gear opening 20 through the transparent hole 54A of the reel plate 54.

Thereby, an operation of the reel 30, that is to say, chucking (holding) and rotation drive from outside of the case 12, is possible. Also, in this state, an annular regulation rib 58, which is disposed on the top plate 14A in a standing manner, enters an upper end portion inner peripheral surface side of the reel hub 32 of the reel 30. The regulation rib 58 is configured such that an outer peripheral surface thereof comes closer to an inner peripheral surface of the short tubular portion 40A of the upper flange 40, thereby preventing bumping of the reel 30 in the case 12.

Figure 4:
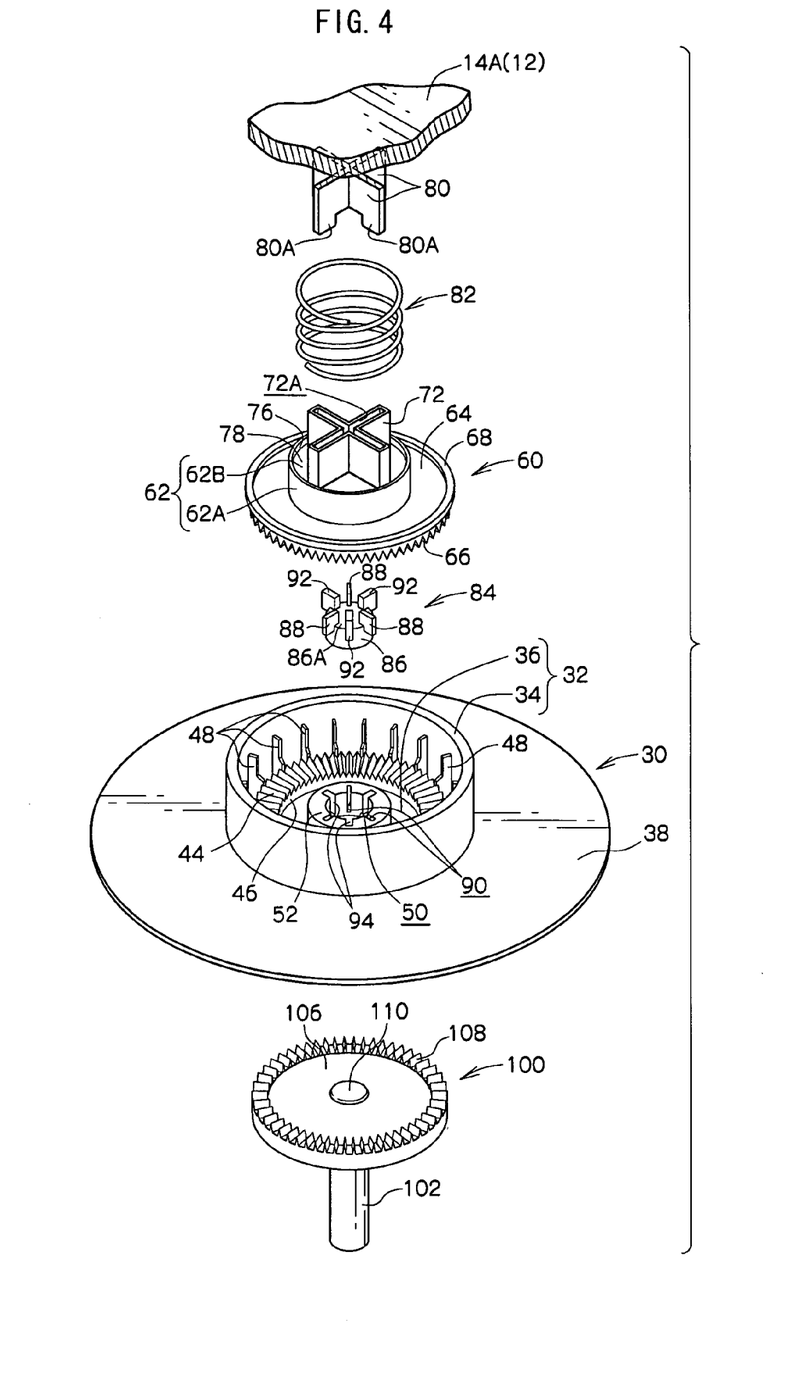
FIG. 4 is a schematic exploded perspective view of braking means of the recording tape cartridge and a rotational shaft of a drive device from above.
Figure 5:
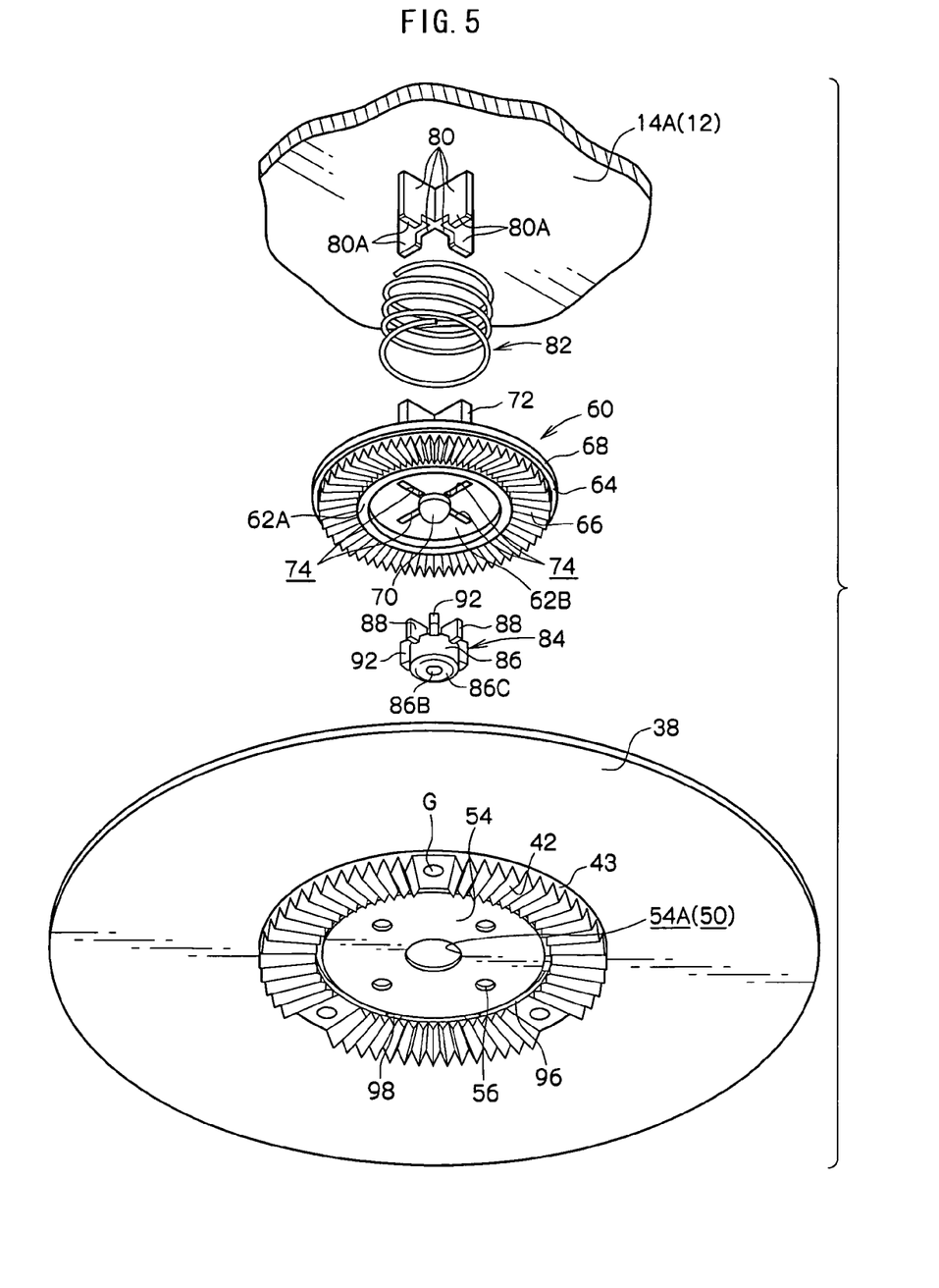
FIG. 5 is a schematic exploded perspective view of the braking means of the recording tape cartridge from below.

Further, the recording tape cartridge 10 is provided with the braking member 60 as braking means for preventing the rotation of the reel 30 when not used. As shown in FIGS. 4 and 5, the braking member 60 has a base portion 62. The base portion 62 is formed into a cylindrical shape which opens downward with a substantial bottom. The base portion 62 is provided with a tubular portion 62A formed into a short cylindrical shape, and a circular plate portion 62B blocking an upper end of the tubular portion 62A. Then, an annularly formed ring portion 64 extends radially outside from an intermediate portion in a direction of axis on the outer peripheral portion of the base portion 62 (tubular portion 62A) along the entire circumference thereof.

A braking gear 66 is disposed along the entire circumference of the lower surface of the ring portion 64. That is to say, the braking gear 66 is annularly formed as whole and is configured to be engageable with the engaging gear 44 of the reel 30. Also, an annular reinforcing rib 68 is disposed at the upper surface of the ring portion 64 in a standing manner along an outer edge portion thereof, thereby ensuring the rigidity of the ring portion 64 (braking gear 66). In addition, a slide-contact projection 70 is provided from the axial center portion of the lower surface on the circular plate portion 62B of the base portion 62 (radially inside of the tubular portion 62A) in a protruding manner. A tip end portion of the slide-contact projection 70 is formed into a substantially spherical surface, thereby substantially point-contacting a clutch member 84 as described later.

In the meantime, a cross-shaped projection 72, within which an insertion groove 72A in a substantially cross-shape in plan view is formed, is provided at the upper surface of the circular plate portion 62B in a standing manner. Also, a through-hole 74 is provided to passes through the circular plate portion 62B in a plate-thickness direction. The through-hole 74 is divided in quarters and each of them is formed in rectangular so as to engage with the radially outer side portion except the axial center portion (crossing portion) in the insertion groove 72A formed into cross-shape in plan view.

Thereby, each of the through-holes 74 is located so as to be adjacent to the radially outer side of the slide-contact projection 70 and opens to the inner portion of the tubular portion 62A. Also, an annular rib 76 is disposed on an upper end outer peripheral edge portion of the base portion 62 in a standing manner. An upper surface of the circular plate portion 62B between the rib 76 and the cross-shaped projection 72 is provided with a spring receiving surface 78 which one end portion of a compression coil spring 82 as described later abuts.

The braking member 60 thus configured is inserted into the reel hub 32 to be movable in the vertical direction (axial line direction of the reel 30) and substantially coaxial. That is to say, the braking member 60 may take a position to engage the braking gear 66 with the engaging gear 44 of the reel 30 (reel hub 32) (rotation locking position) and a position to release the engagement (rotation allowing position) by moving in the vertical direction.

In addition, a cross-shaped rib 80, disposed on the top plate 14A of the case 12 in a downwardly protruding fashion, enters the insertion groove 72A of the cross-shaped projection 72 of the braking member 60. The cross-shaped rib 80 is formed into a baffle-shape in which two thin plate pieces are crossed so as to be orthogonal to each other, and is configured to prevent the rotation of the braking member 60 relative to the case 12 by engaging with the cross-shaped projection 72 (groove wall of the insertion groove 72A).

Therefore, the braking member 60 may prevent the reel 30 from rotating by engaging the braking gear 66 with the engaging gear 44 of the reel hub 32. Meanwhile, the cross-shaped rib 80 remains inside the insertion groove 72A along an entire vertical movement stroke of the braking member 60, and guides the movement of the braking member 60 in a vertical direction. The braking member 60 is configured such that a radial movement thereof is controlled by the standing ribs 48 of the reel 30 when it is located at the rotation locking position, and when it is located at the rotation allowing position, the braking member 60 does not interfere with the rotation of the standing ribs 48 with the reel 30.

That is to say, when the braking member 60 is located at the rotation locking position, the standing ribs 48 are positioned close to the outer peripheral edge portion (reinforcing rib 68) of the ring portion 64 of the braking member 60, and an upper portion of the standing ribs 48 is cut away such that, when the braking member 60 is located at the rotation allowing position, a gap between the standing ribs 48 and the outer peripheral edge portion (reinforcing rib 68) of the braking member 60 is a predetermined value or larger. Thereby, the movement of the reel 30 is not only directly controlled by the case 12, but a radial movement thereof relative to the case 12 is also controlled by the braking member 60 positioned in the vicinity of a center of gravity position of the reel 30, so that the reel 30 is stably mountable to a longitudinally arranged drive device (such as when the axis of the reel 30 is in a horizontal direction).

Further, a protruding piece 80A, which is insertable to each through-hole 74 of the braking member 60, is disposed on a lower end portion of the cross-shaped rib 80 in an extending manner. Each protruding piece 80A is located in the insertion groove 72A when the braking member 60 is located in the rotation locking position, and enters into the through-hole 74 when the braking member 60 is located in the releasing position, and protrudes from the lower surface of the circular plate portion 62B (passes through the through-hole 74). By thus disposing each protruding piece 80A in an extending manner, the cross-shaped rib 80 not only prevents the rotation of the braking member 60 relative to the case 12, but also increases an engaging amount (insertion depth) with the braking member 60, thereby preventing tilt of the braking member 60 relative to the case 12.

In addition, a compression coil spring 82, which is recognized as biasing means in the general meaning, is disposed between the spring receiving surface 78 of the braking member 60 and the top plate 14A. One end portion of the compression coil spring 82 abuts the spring receiving surface 78 and the other end portion thereof abuts on the top plate 14A, and the other end portion is located inside of the annular wall portion 83, which is disposed in a protruding manner from the radially outer side of the cross-shaped rib 80 in the top plate 14A, so that the compression coil spring 82 does not misalign in the radial direction.

Then, the braking member 60 is biased downward by biasing force of the compression coil spring 82, and the braking gear 66 generally is engaged with the engaging gear 44, thereby surely preventing careless rotation of the reel 30 (braking member 60 is located on the rotation locking position). Also, by this biasing force, the reel 30 also is biased downward to abut on the annular rib 22, so that this is not bumped in the case 12.

In addition, the recording tape cartridge 10 is provided with the clutch member 84 as a releasing member operated from outside when releasing the lock state of the reel 30 by the braking member 60. The clutch member 84 is disposed between the base portion 36 of the reel 30 and the braking member 60. As shown in FIGS. 4 and 5, the clutch member 84 has a clutch body 86 formed in a substantially cylindrical shape. The clutch body 86 is formed such that an outer diameter thereof is substantially the same as that of the transparent hole 54A of the reel plate 54, that is to say, slightly smaller than an inner diameter of the through-hole 50, which conforms to the inner diameter of the boss portion 52 for clutch.

A planar axial center portion upper end surface of the clutch body 86 is provided with a slide-contact surface 86A, which always abuts on the slide-contact projection 70 of the braking member 60. Also, a planar lower end surface around a body reducing hole 86B, which is provided so as to open downward in the clutch body 86, is made a pressuring operating surface 86C. Then, the clutch member 84 moves upward against the biasing force of the compression coil spring 82 when the pressing operation surface 86C is pushed, thereby making the braking member 60 to move to the rotation allowing position.

Further, the clutch member 84 is provided with a rotation regulation rib 88, which hangs radially outer side of an outer peripheral surface of the clutch body 86. A plurality of (three, in the shown example) rotation regulation ribs 88 are disposed on the clutch body 86 in a peripheral direction thereof at regular intervals, and each rotation regulation rib 88 is radially disposed in plane view. Also, each rotation regulation rib 88 protrudes above the slide-contact surface 86A so as to stride from an upper end surface around the slide-contact surface 86A of the clutch body 86 to an outer peripheral surface in the vicinity of the upper end surface (continuous to each of them).

Each rotation regulation rib 88 enters into a rotation regulation groove 90, which is formed to make a recess on an inner peripheral surface of the boss portion 52 for clutch. That is to say, three rotation regulation grooves 90 are disposed on the boss portion 52 for clutch in a peripheral direction thereof at regular intervals. Each rotation regulation groove 90 is opened upward at an upper end of the boss portion 52 for clutch. Thereby, the clutch member 84 is capable of moving in the vertical direction while being guided by the rotation regulation groove 90 of the boss portion 52 for clutch at the rotation regulation rib 88.

Further, each rotation regulation rib 88 is configured to remains inside the rotation regulation groove 90 of the boss portion 52 for clutch even when the clutch member 84 moves upward to locate the braking member 60 on the rotation allowing position. Thereby, the clutch member 84 is configured not to be able to rotate relative to the reel 30, that is to say, it is configured to rotate always integrally with the reel 30.

Further, since each rotation regulation groove 90 is blocked at the lower end portion of the boss portion 52 for clutch, it is possible to prevent the clutch member 84 from dropping out from the reel hub 32 by the rotation regulation rib 88 and the rotation regulation groove 90, and the clutch member 84 is provided with a seat rib 92, which prevents the dropping out of the reel hub 32, besides the rotation regulation rib 88.

A plurality of (three in total, on an intermediate portion in a peripheral direction between each rotation regulation rib 88, in the shown example) seat ribs 92 are disposed on the clutch body 86 in a peripheral direction thereof at regular intervals. Seat ribs 92 protrude upward and radially outwards so as to stride from the upper end surface around the slide-contact surface 86A of the clutch body 86 to the outer peripheral surface in the vicinity of the upper end surface, and are radially disposed in plane view, similar to the rotation regulation rib 88.

Each seat rib 92 is configured to enter a stopper groove 94, which is disposed to make a recession in the inner peripheral surface of the boss portion 52 for clutch. That is to say, each stopper groove 94 is disposed in the intermediate portion in the peripheral direction of each rotation regulation groove 90, in the peripheral direction of the boss portion 52 for clutch at regular intervals. Each stopper groove 94 opens upward at the upper end of the boss portion 52 for clutch, and the base portion upper surface, which blocks the lower end portion thereof, is provided with a stopper surface 94A. A lower end surface of each seat rib 92 is adapted to abut (seat on) the stopper surface 94A, when the braking member 60 is on the rotation locking position.

Further, as shown in FIGS. 2 and 3, a rotation shaft 100 is provided with a rotation axis 102, and a circular plate-shaped rotation table 104 is coaxially and integrally disposed on an upper end of the rotation axis 102. A drive gear 108, which is engageable with the reel gear 42 of the recording tape cartridge 10, is annularly formed at the upper surface of the rotation table 104 and the outer peripheral edge portion. Also, at the upper surface of the rotation table 104, a magnet 106 formed in a substantially circular plate-shape is coaxially disposed at a radially inner side of the drive gear 108. A releasing projection 110, which abuts the pushing operation surface 86C of the clutch member 84, is formed on the axial center portion of the rotation table 104.

Next, an action of the recording tape cartridge 10 provided with the reel 30 and the braking means configured as above will be described. In the recording tape cartridge 10, the braking member 60 is located on the rotation locking position to engage the braking gear 66 with the engaging gear 44 by the biasing force of the compression coil spring 82, when not used. Therefore, the reel 30 is prevented from rotating relative to the case 12. At this time, the reel gear 42 of the reel 30 exposes from the gear opening 20, and the clutch body 86 of the clutch member 84 is inserted into the through-hole 50 and the transparent hole 54A, to face the gear opening 20.

On the other hand, when using the recording tape T, the recording tape cartridge 10 is loaded into a bucket (not shown) of the drive device in the arrow A direction. Then, when the recording tape cartridge 10 is loaded into the bucket with a predetermined depth, the bucket is lowered and the rotation shaft 100 of the drive device relatively comes closer to the gear opening 20 of the case 12 (moves upward) to hold the reel 30. Specifically, the rotation shaft 100 engages the drive gear 108 thereof with the reel gear 42 while adsorb-retaining the reel plate 54 by the magnet 106 out of touch with the same.

With this engagement of the reel gear 42 with the drive gear 108, that is to say, with the relative movement of the rotation shaft 100 to a closer side to the case 12 in the axial direction, the releasing projection 110 of the rotation shaft 100 abuts on the pushing operation surface 86C of the clutch member 84, thereby raising the clutch member 84 upward against the biasing force of the compression coil spring 82. Thereby, the braking member 60, which abuts on the clutch member 84 at the slide-contact projection 70, moves upward, thereby releasing the engagement of the braking gear 66 with the engaging gear 44, and moves to a relative rotation allowing position relative to the reel 30.

That is to say, when the rotation shaft 100 relatively moves upward, the reel 30 is raised upward together with the clutch member 84 and the braking member 60 (without changing the relative position) against the biasing force of the compression coil spring 82, and the braking member 60 reaches the rotation allowing position (relative to the case 12) and the lower flange 38 leaves from the annular rib 22 (tapered surface 22A). Thereby, the reel 30 floats in the case 12 and becomes rotatable in a state out of contact with the inner surface of the case 12.

In addition, due to a descent of the bucket, that is to say, the recording tape cartridge 10 in the drive device, the positioning pins of the drive device enter each of the positioning holes 24 and 26 of the case 12, respectively, and the reference surface of the drive device abuts on each of the reference surfaces 24A and 26A of the case 12. Thereby, the horizontal direction and the vertical direction of the recording tape cartridge 10 relative to the drive device are positioned. Then, pull-out means of the drive device pulls the reader block 28 out of the case 12 and guides the reader block 28 to the take-up reel of the drive device, while engaging with the engaging concave portion 28A of the reader block 28.

Then, the reader block 28 is inserted into the reel hub of the take-up reel, and the circular arc surface 28B thereof forms a portion of the take-up surface, which takes up the recording tape T. In this state, when the reader block 28 rotates integrally with the take-up reel, the recording tape T is pulled out of the case 12 through the opening 18, while being wound on the reel hub of the take-up reel. Meanwhile, at this time, the reel 30 of the recording tape cartridge 10 rotates in synchronization with the take-up reel, by the rotational force of the rotation shaft 100, which is transmitted by the drive gear 108 engaging with the reel gear 42.

Then, by a recording/playback head (not shown), which is disposed along a predetermined tape path of the drive device, information is recorded on the recording tape T, or the information recorded on the recording tape T is played back. Meanwhile, at this time, the slide-contact projection 70 of the braking member 60, which is not rotatable relative to the case 12, slide-contacts the slide-contact surface 86A of the clutch member 84, which rotates together with the reel 30 relative to the case 12. That is to say, the clutch member 84 is configured to hold the braking member 60 in the rotation allowing position, with a state abutting the releasing projection 110 on the pushing operation surface 86C maintained, in a state in which the reel gear 42 engages with the drive gear 108.

In addition, when the reel 30 rotates, there is no relative rotation between the clutch member 84, which rotates integrally with the reel 30, and the rotation shaft 100, which drives the reel 30, the pushing operation surface 86C and the releasing projection 110 do not slide-contact each other, and the slide-contact surface 86A of the clutch member 84 and the slide-contact projection 70 of the braking member 60, which is not rotatable relative to the case 12, slide-contact each other. In this manner, since there is no relative rotation between the rotation axis 102 and the clutch member 84, there is not a problem that the releasing projection 110 and the pushing operation surface 86C are abraded.

On the other hand, when the recording of the information on the recording tape T, or the playback of the information recorded on the recording tape T is finished, the recording tape T is rewound on the reel 30 and the reader block 28 is held in the vicinity of the opening 18 of the case 12. Then, the bucket into which the recording tape cartridge 10 is loaded is raised. Then, the engagement of the reel gear 42 with the drive gear 108 is released and the abutment of the releasing projection 110 and the pushing operation surface 86C of the clutch member 84 is released, and the clutch member 84 moves downward together with the braking member 60 (while maintaining the abutment state) by the biasing force of the compression coil spring 82.

Thereby, each seat rib 92 of the clutch member 84 abuts the stopper surface 94A and the braking gear 66 of the braking member 60 engages with the engaging gear 44. That is to say, the braking member 60 returns to the rotation locking position, at which this prevents the rotation of the reel 30 relative to the case 12. Also, the reel 30 moves downward with the motion, which the braking member 60 and the clutch member 84 moves by the biasing force of the compression coil spring 82, and while making the lower flange 38 abut on the annular rib 22, returns to an initial state in which the reel gear 42 is exposed from the gear opening 20. In this state, the recording tape cartridge 10 is ejected from the drive device (bucket).

Next, operation of the reel 30 according to the exemplary embodiment is described in detail. As shown in FIG. 6, six groove portions 96 are formed at regular interval (for example, with the central angle θ=40 degrees) in the circumferential direction between the reel gear 42 and the reel plate 54 at the lower surface (outer surface) of the base portion 36 of the reel hub 32 of the reel 30.

In particular, a groove portion 96 is necessarily (at least) formed at the predetermined area (corresponding to a width of non-toothed portion) E on the virtual straight line K connecting the rotational center O of the reel 30 (reel hub 32) and the gate trace G. That is to say, at least at the predetermined area E on the virtual straight line K connecting the rotational center O of the reel 30 (reel hub 32) and the gate trace G a holding portion of the reel plate 54.

Figure 7:
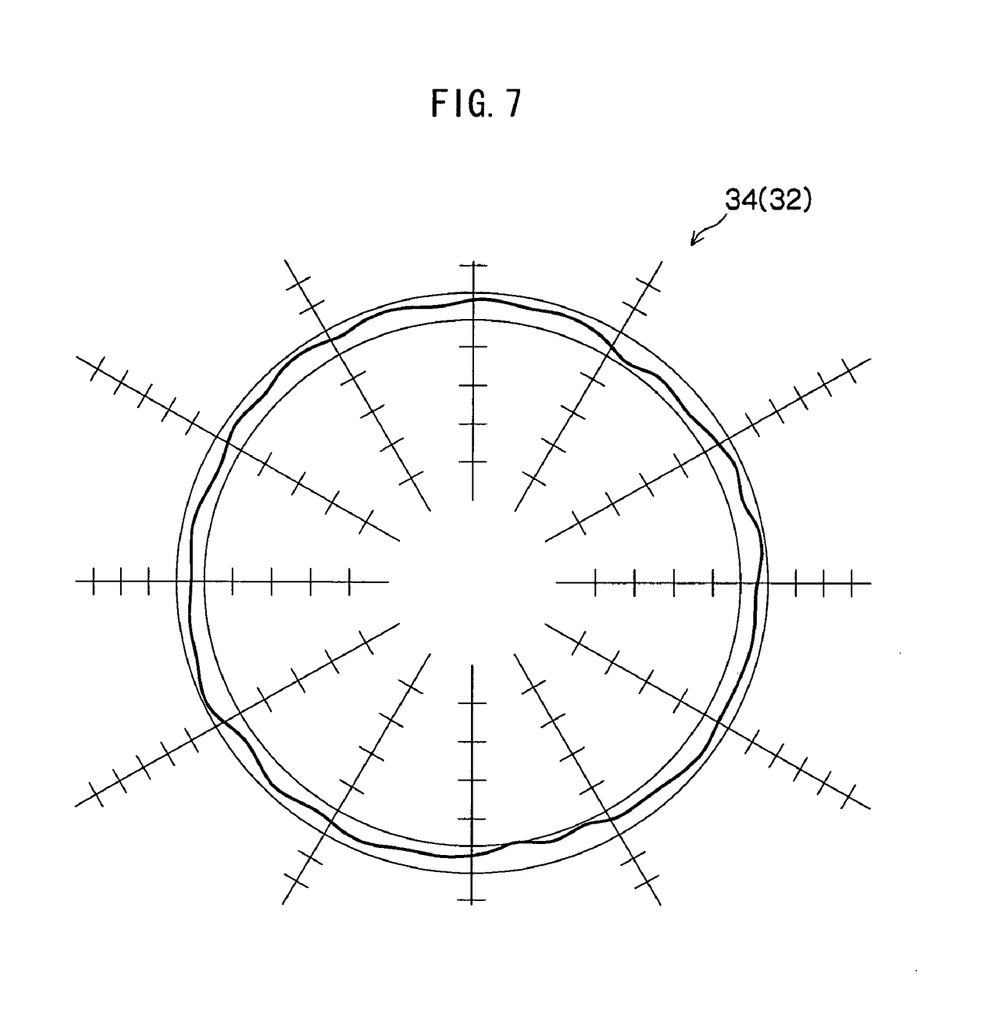
FIG. 7 is an illustration diagram showing a result of measuring circularity of an outer peripheral surface of the reel hub of the reel according to the exemplary embodiment.

Therefore, when resin material contracts (cools) upon removal from the mold, the reel plate 54 does not suppress contraction of resin material in the vicinity of gate trace G at which resin pressure is high, and the amount of contraction is low, especially at an inner side of gate trace G in a radial direction of the reel hub 32, and resin material at the outer peripheral surface of the reel hub 32 (cylindrical portion 34) is substantially evenly contracted in a circumferential direction. Therefore, as shown in FIG. 7, the outer peripheral surface of the reel hub 32 (cylindrical portion 34) is formed into a substantially regular hexagon in plan view, and thus the circularity thereof may be improved (insufficient circularity may be ameliorated).

Figure 8:
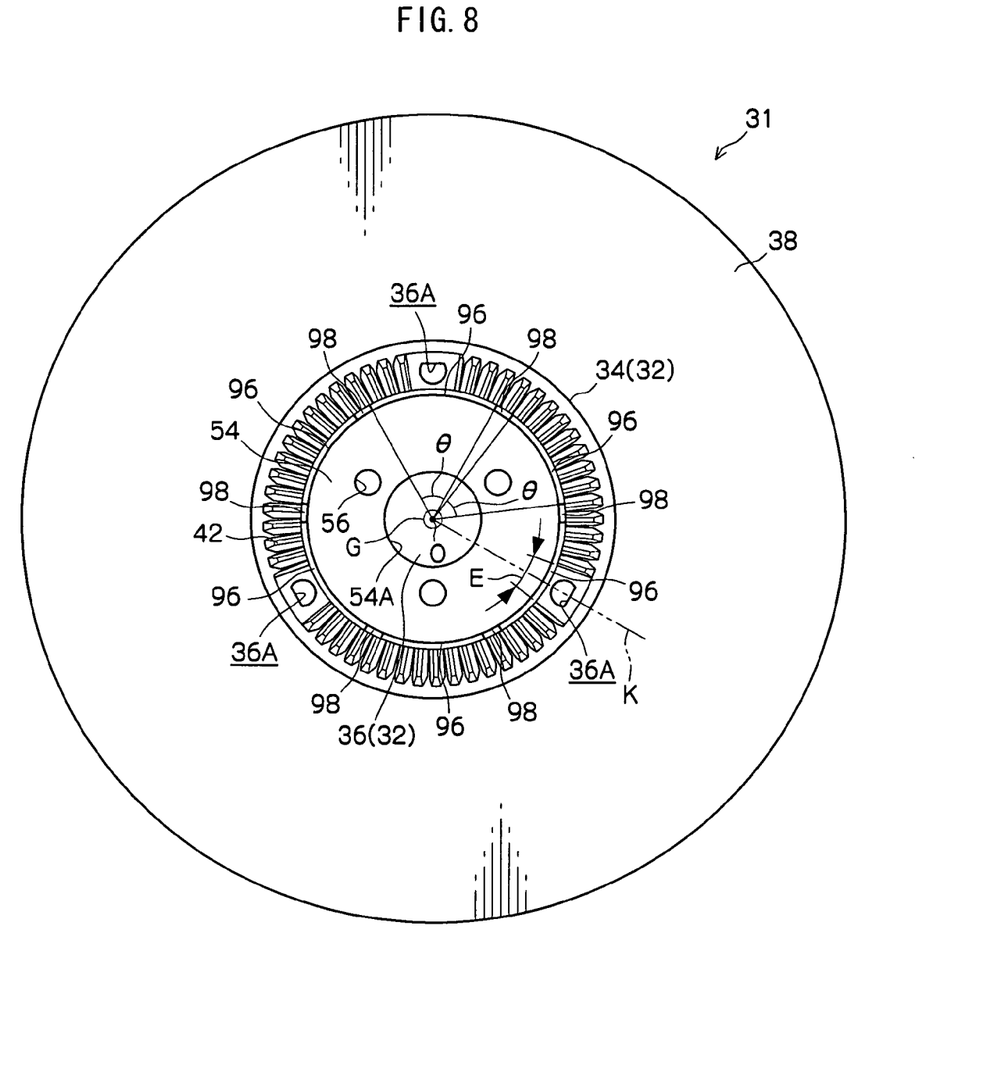
FIG. 8 is a schematic bottom view showing a base portion of a reel hub of another reel according to the exemplar embodiment.

The reel 31 shown in FIG. 8 is configured similarly. In the reel 31, the same reference numerals are given to elements corresponding to those of the reel 30, and detailed description thereof is omitted. In the reel 31, the gate (gate trace G) is provided at the rotational center O of the reel hub 32, and three through holes 36A having a substantially "D" shape in a bottom view through which leg portions of a releasing member (not shown) penetrate are formed at the reel gear 42.

In the reel 31 thus configured, the contraction amount of the resin material in the area E without teeth, at which the through hole 36A is formed, is different from the contraction amount of the resin material at an area with teeth. Therefore, as in the case of the conventional reel 130 shown in FIG. 10, the outer peripheral surface of the reel hub 132 might be formed into a substantial regular triangle in plan view.

However, it is configured that the groove portion 96 is necessarily (at least) formed at the predetermined area (of the width of the area without teeth) E on the virtual straight line K connecting the rotational center O of the reel 31 (reel hub 32) and the through hole 36A. That is to say, in the mold, at least the predetermined area E on the virtual straight line K connecting the rotational center O of the reel 30 (reel hub 32) and the through hole 36A is made the holding portion of the reel plate 54.

Therefore, when the resin material contracts (cools) upon removal from the mold, the reel plate 54 does not suppress the contraction of the resin material in the vicinity of the area E without teeth (the through hole 36A), especially at a radially inner side of the area E without teeth (through hole 36A), and the contraction amount of the resin material in the area E without teeth approaches the contraction amount of the resin material in the area with teeth; thereby, the contraction of the resin material at the outer peripheral surface of the reel hub 32 (cylindrical portion 34) becomes substantially even in the circumferential direction. Therefore, in this case also, as shown in FIG. 7, the outer peripheral surface of the reel hub 32 (cylindrical portion 34) is formed into a substantially regular hexagon in plan view, and the circularity thereof may be improved (insufficient circularity may be ameliorated).

As described above, when six or more (at least six) groove portions 96 are formed at regular intervals in the circumferential direction between the reel gear 42 and the reel plate 54, when the resin material contracts (cools) upon removal from the mold, six or more areas in which the reel plate 54 suppresses the contraction of the resin material (areas in which the engagement portions 98 are formed) and six or more areas without suppression are alternately arranged, and thereby the outer peripheral surface of the reel hub 32 (cylindrical portion 34) is formed into a substantially regular hexagon or a polygon with more sides in plan view, and the contraction of the resin material at the outer peripheral surface of the reel hub 32 (cylindrical portion 34) becomes substantially even in a circumferential direction.

This configuration may be similarly applied to the case of a reel (not shown) provided with the reel gear 42 on which the area E without teeth is not formed, and in this case also, the circularity of the outer peripheral surface of the reel hub 32 (cylindrical portion 34) may be improved (insufficient circularity may be ameliorated). Also, although it is desirable that six or more groove portions 96 are formed in the circumferential direction at regular intervals, when a plurality of areas E without teeth such as the gate traces G or the through holes 36A are formed on the reel gear 42, the number of groove portions 96 is more preferably an integral multiple of 2 times or more with respect to the number of the plurality of gate traces G or the through holes 36A (areas E without teeth), to improve circularity.

In addition, although the example in which the invention is applied to the reel 30 in which the lower flange 38 is integrally formed with the reel hub 32 is shown in the above-described exemplary embodiment, the invention is not limited to this, and may be applied to the reel (not shown) in which the upper flange 40 is integrally formed with the reel hub 32, for example. In short, the invention is applicable to all of the reels of other exemplary embodiments in which the outer peripheral surface (outer diameter) of the reel hub 32 (cylindrical portion 34) deviates from the perfect circle in plan view due to a contraction imbalance of the resin material upon injection molding.

Also, although it is configured that the recording tape cartridge 10 has the reader block 28 as the reader member, in the example, the invention is not limited to this, and may be configured such that a small cylindrical reader pin is attached on the tip end of the recording tape T as the reader member, for example, and further, configured to have a shielding member (such as a slide door, which moves along a predetermined straight line or a circular arc), which opens and closes the opening 18.

In addition, although the example in which the reel 30 is applied to the recording tape cartridge 10 is shown in the above-described example, the invention is not limited to this, and is applicable to a recording tape cassette (not shown) in which two reels for supplying and taking up are accommodated in the case, for example. In this case, it goes without saying that the invention may be applied at least one reel. Also, the invention is applicable to the take-up reel or the like of the drive device.

Further, although it has been configured that the recording tape T such as the magnetic tape is used in the example, the invention is not limited to this, and it is sufficient that the recording tape T is recognized as the information recording/playback media in a long tape shape, capable of recording the information and playing back the recorded information, and it goes without saying that the reel 30 according to the invention is applicable to the recording tape T of any recording/playback system.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A reel comprising:
    a cylindrical resin hub with a base and an outer peripheral surface around which a recording tape is wound;
    a reel gear formed at an outer surface of a base portion of the hub which engages with a drive gear of a drive device;
    a metal reel plate provided at the outer surface of the base portion of the hub on a radially inner side of the reel gear by insert molding;
    a gate trace formed on the base portion of the hub; and
    a plurality of groove portions formed at regular intervals in a circumferential direction between the reel gear and the reel plate, wherein
    the groove portions are formed at least at a predetermined area on a virtual straight line connecting a center portion of the hub and a gate trace.

2. The reel according to claim 1, wherein an engagement portion that engages with the reel gear and the reel plate is formed between groove portions adjacent to each other.

3. A reel comprising:
    a cylindrical resin hub with a base and an outer peripheral surface around which a recording tape is wound;
    a reel gear formed at an outer surface of a base portion of the hub which engages with a drive gear of a drive device;
    a metal reel plate provided at the outer surface of the base portion of the hub on a radially inner side of the reel gear by insert molding;
    an area without teeth formed on the reel gear; and
    a plurality of groove portions formed at regular intervals in a circumferential direction between the reel gear and the reel plate, wherein
    the groove portions are formed at least at a predetermined area on a virtual straight line connecting a center portion of the hub and the area without teeth.

4. The reel according to claim 3, wherein an engagement portion that engages with the reel gear and the reel plate is formed between groove portions adjacent to each other.

5. The reel according to claim 3, wherein a gate trace is formed at a rotational center of the base portion of the hub, and a through hole is formed at the area without teeth.

6. A reel comprising:
    a cylindrical resin hub with a base and an outer peripheral surface around which a recording tape is wound;
    a reel gear formed at an outer surface of a base portion of the hub which engages with a drive gear of a drive device;
    a metal reel plate provided at the outer surface of the base portion of the hub on a radially inner side of the reel gear by insert molding; and
    six or more groove portions formed at regular intervals in a circumferential direction between the reel gear and the reel plate.

7. The reel according to claim 6, wherein an engagement portion that engages with the reel gear and the reel plate is formed between groove portions adjacent to each other.

* * * * *